United States Patent
Duale et al.

(10) Patent No.: US 10,386,911 B2
(45) Date of Patent: Aug. 20, 2019

(54) SCREEN TURN OFF OVERRIDE CONTROL

(71) Applicant: INTERNATIONAL BUSINESS MACHINES CORPORATION, Armonk, NY (US)

(72) Inventors: Ali Y. Duale, Poughkeepsie, NY (US); Shailesh R. Gami, Poughkeepsie, NY (US); Louis P. Gomes, Poughkeepsie, NY (US); Rajaram B. Krishnamurthy, Pleasant Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/482,150

(22) Filed: Apr. 7, 2017

(65) Prior Publication Data

US 2018/0292881 A1  Oct. 11, 2018

(51) Int. Cl.
| | | |
|---|---|---|
| *G09G 5/00* | (2006.01) | |
| *G06F 1/3246* | (2019.01) | |
| *G06F 11/30* | (2006.01) | |
| *G06F 1/3228* | (2019.01) | |
| *G06F 1/3287* | (2019.01) | |
| *G06F 9/4401* | (2018.01) | |
| *G06F 9/445* | (2018.01) | |

(52) U.S. Cl.
CPC .......... *G06F 1/3246* (2013.01); *G06F 1/3228* (2013.01); *G06F 1/3287* (2013.01); *G06F 11/3041* (2013.01); *G06F 11/3055* (2013.01); *G06F 11/3089* (2013.01); *G06F 9/4418* (2013.01); *G06F 9/44505* (2013.01)

(58) Field of Classification Search
CPC ...... G06F 3/041; G06F 3/0414; G06F 3/0418; G06F 3/044; G06F 3/0484
See application file for complete search history.

(56) References Cited

U.S. PATENT DOCUMENTS

| | | | | |
|---|---|---|---|---|
| 8,159,551 B2 * | 4/2012 | Katz | ..................... | G06F 1/3203 348/222.1 |
| 8,665,219 B2 * | 3/2014 | Unger | ............... | H04M 1/72527 345/169 |
| 8,723,979 B2 * | 5/2014 | Katz | ..................... | G06F 1/3203 348/222.1 |

(Continued)

FOREIGN PATENT DOCUMENTS

WO    2016054942 A1    4/2016

OTHER PUBLICATIONS

Nield, David, "How to Keep Your Android Device's Screen From Ever Going to Sleep", http://fieldguide.gizmodo.com/how-to-keep-your-android-devices-scree . . . , Feb. 11, 2015, printed Jun. 22, 2016, pp. 1-4.

*Primary Examiner* — Vijay Shankar
(74) *Attorney, Agent, or Firm* — Cantor Colburn LLP; Steven Chiu

(57) ABSTRACT

Embodiments include method, systems and computer program products for display turn off override control. Aspects include receiving an indication of the launching of a mobile application on an electronic device. An override authorization is requested from a user of the electronic device. The automatic display turn off features of the electronic device is altered based at least in part on receiving an override authorization from the user.

16 Claims, 4 Drawing Sheets

(56) References Cited

U.S. PATENT DOCUMENTS

| | | |
|---|---|---|
| 9,350,852 B1 | 5/2016 | Gudivada et al. |
| 2010/0159995 A1 | 6/2010 | Stallings et al. |
| 2011/0047368 A1 | 2/2011 | Sundaramurthy et al. |
| 2012/0173890 A1 | 7/2012 | Root et al. |
| 2014/0101472 A1 | 4/2014 | Rohrweck |
| 2014/0198054 A1* | 7/2014 | Sharma ............ H04M 1/72519 345/173 |
| 2015/0168174 A1 | 6/2015 | Abramson et al. |
| 2015/0234442 A1 | 8/2015 | Emami et al. |

* cited by examiner

SCREEN TURN OFF OVERRIDE CONTROL

BACKGROUND

The present disclosure relates to electronic device screens and, more specifically, to methods and systems for screen turn off override control.

An electronic device, such as a cell phone, will save power by automatically dimming or turning off the device screen after a turn off timer expires. The electronic device will monitor activity, such as a user touching a screen or a user engaging a peripheral device. After a certain amount of inactivity, the turn off timer will expire causing the device screen to turn off or dim. This feature allows for these electronic devices to preserve battery life.

The automatic turn off feature is sometimes undesirable. In the case where a user is fixated on the screen but not actively touching or interacting with the screen, this feature can frustrate a user's ability to utilize the device. For example, the turn off feature would not be desirable if a user is playing a video game that does not require active touching of the screen (e.g., the accelerometer feature of the device is used to control the device).

Most cell phone users enable some sort of screen locking mechanism of the cell phone to prevent others from using the cell phone. When the screen automatically turns off after the screen turn off timer expires, the cell phone's screen locking mechanism also locks the cell phone. Thus, the user must also perform the additional task of waking up the cell phone and unlocking it before continuing with the interrupted operation.

SUMMARY

Embodiments include a computer-implemented method for display turn off override control, the method includes receiving an indication of the launching of a mobile application on an electronic device. An override authorization is requested from a user of the electronic device. The automatic display turn off features of the electronic device is altered based at least in part on receiving an override authorization from the user.

Embodiments include a computer system for display turn off override control, the computer system for display turn off override control having a processor, the processor configured to perform a method. The method includes receiving an indication of the launching of a mobile application on an electronic device. An override authorization is requested from a user of the electronic device. The automatic display turn off features of the electronic device is altered based at least in part on receiving an override authorization from the user.

Embodiments also include a computer program product for display turn off override control, the computer program product including a non-transitory computer readable storage medium having computer readable program code embodied therewith. The computer readable program code including computer readable program code configured to perform a method. The method includes receiving an indication of the launching of a mobile application on an electronic device. An override authorization is requested from a user of the electronic device. The automatic display turn off features of the electronic device is altered based at least in part on receiving an override authorization from the user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

Figure 1:
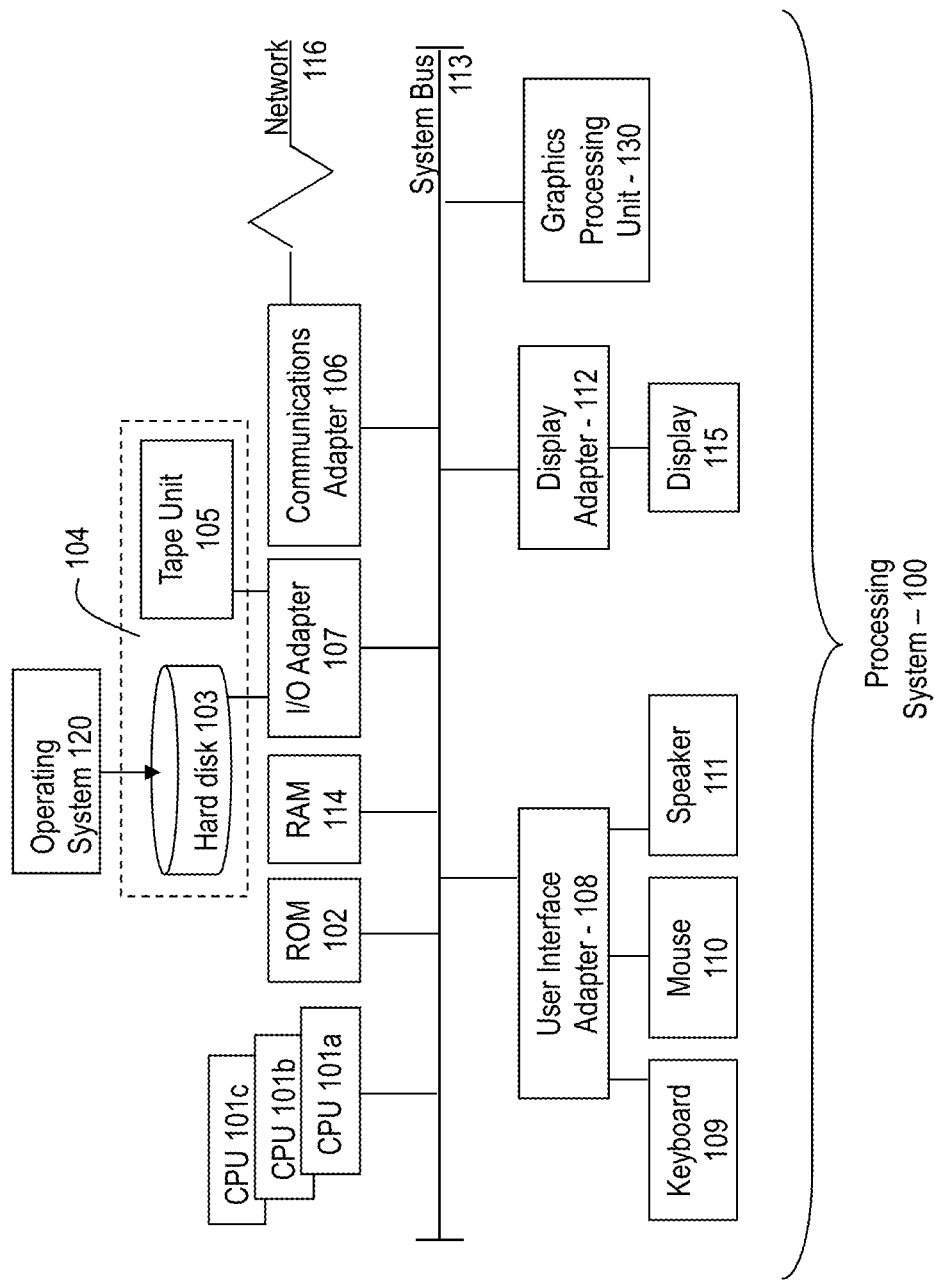
FIG. 1 depicts a block diagram of a computer system for use in practicing the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of the aspects of the invention, one or more embodiments of the invention provide methods, systems, and computer program products for screen turn off override control. In one or more exemplary embodiments, methods for screen turn off override control include altering an automatic screen turn off feature of an electronic device. Most electronic devices include a screen turn off timer which monitors inactivity for the electronic device and after a certain amount of time passes with inactivity, the screen or display of the electronic device will dim or turn off to conserve power and battery life. There are many scenarios where it is undesirable to have this automatic screen turn off feature. For example, certain mobile applications, such as video games, do not require active touching of a touch screen for an electronic device for long periods of time. Still, a user can be actively engaged in viewing the electronic device's screen. For mobile applications, an override feature can be utilized to prevent a display screen from turning off prematurely.

In one or more embodiments of the present invention, a cell phone maintains a list of all the mobile applications that are currently installed on the cell phone. The cell phone continuously monitors the mobile applications that are opened by the user after the user wakes up the cell phone for use. After the user opens up a mobile application, the cell phone prompts the user to determine that a user wishes to alter the automatic screen turn off feature of the cell phone. The cell phone user decides that he or she wants to override the automatic screen turn off feature after the user opens a mobile application, like a video game. If the user chooses to use this override feature, then the cell phone's screen does not turn off until the user manually turns off the cell phone screen, or all the open mobile applications with the automatic screen turn off feature disabled and/or delayed are closed and the screen turn off timer expires.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
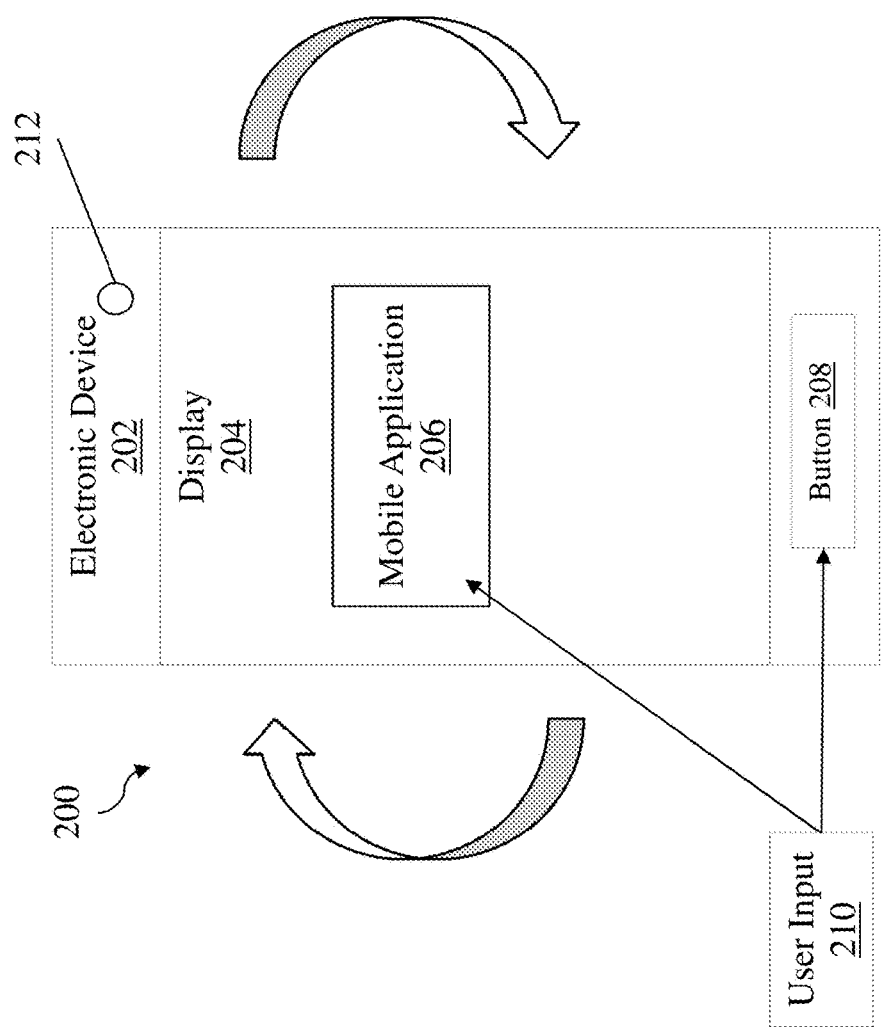
FIG. 2 depicts a block diagram of a system for display turn off override control in accordance with one or more embodiments.

Referring to FIG. 2 there is shown a system 200 for screen turn off override control according to one or more embodiments. The system 200 includes an electronic device 202 having a display 204 and a button 208. The display 204 on the electronic device 202 can display a mobile application 206 and can receive a user input 210 via the display 204 and the button 208. For ease of illustration, one button 208 and one mobile application 206 are shown. However, more than one button 208 and mobile application 206 can be present on the electronic device 202.

In one or more embodiments of the present invention, the electronic device 202 can have the automatic display (screen) turn off timer altered. To conserve battery life or power, most electronic devices 202 have an automatic screen turn off timer which, after a certain amount of inactivity, causes the display 204 to dim or turn off entirely. When a mobile application 206 is opened, it is desirable to have the screen remain on while the mobile application 206 is active. Certain mobile applications can have extended periods of time where a user may not be actively touching the screen 204. During this time, the mobile application 206 is active but not receiving active inputs from a user of the electronic device 202. An example of a mobile application 206 includes but is not limited to a video game, a video playing application, a text message application, a web browsing application, a camera or video recording application, and the like. A mobile application 206 is opened by a user of the electronic device 202 through a user input 210 at either the display 204 or the button 208. A user input 210 can be an audio command to the electronic device 202 that can open a mobile application 206. A user input 210 can also be orientating the electronic device 202 a certain way.

When a mobile application 206 is opened on the electronic device 202, the electronic device 202 can display a screen turn off feature override request to the user to allow the user to alter the automatic screen turn off feature. For example, a display window can appear that allows a user to choose how to alter the automatic screen turn off timer. One selection can be to disable the automatic screen turn off feature. Another selection can be to delay the automatic screen turn off feature for a period of time. A third selection can be to not change the screen turn off feature for the particular mobile application.

In one or more embodiments of the present invention, the disabling of the automatic screen turn off feature for the electronic device 202 can be re-enabled when the mobile application 206 is closed or when the display 204 is turned off by the user. Also, the automatic screen turn off feature can be re-enabled when a home screen input is received by the operating system. For example, the button 208 on the electronic device 202 can be pressed to return to a home screen on the display 204 which would re-enable the automatic screen turn off feature.

In one or more embodiments of the present invention, delaying the automatic screen turn off option can be selected when a mobile application is opened on the electronic device. The delay can be user specified based on how long the user anticipates to utilize the mobile application 206 on the electronic device. For example, a user may be trying to watch a video that is 12 minutes long and the automatic screen turn off timer may be set to only 1 minute. The user, in this case, can delay the turn off for the 12 minutes or more to accommodate viewing the entire video. In another embodiment, the system 200 can read the metadata about a video being viewed within the mobile application 206 and delay the automatic screen turn off by the length of the video. For example, if a parent were to hand his or her phone to a child to watch a video for 30 minutes, the system 200 could identify the video as being 30 minutes long and delay the automatic screen turn off for 30 minutes or even 30 minutes plus another minute to allow the child to view the full video. After the video is completed, the screen turn off feature can be reactivated. In this case, exiting the mobile application 206 by the child while the video is playing could cause the automatic screen turn off feature to re-enable immediately and turn off the display 204 or even lock the phone.

In one or more embodiments of the present invention, the electronic device 202 can have a sensor 212 such as a camera lens or a microphone that can collect audio and visual data. Visual data can be collected by the sensor 212 to determine an orientation of the electronic device. The sensor 212 can also recognize familiar images based on visual data collected. This visual data can be utilized to enable the automatic screen turn off function of the electronic device 202. For example, an image of ceiling can indicate that the electronic device 202 is orientated on a table or desk facing straight up. Based at least in part on the orientation as derived from the visual data, the automatic screen turn off function can be enabled if previously disabled or delayed to allow for the screen 204 to turn off for non-usage.

In one or more embodiments of the invention, the opening of a mobile application 206 can trigger an automatic override of the screen turn off function. The override can remain in effect as long as the mobile application 206 is open. The automatic override can occur without an input from the user of the electronic device.

In one or more embodiments of the present invention, a user is given the option to override the screen turn off feature of electronic device 202 screen 204. If a user is utilizing a cell phone, the can choose to override the screen turn off feature and the cell phone's screen will not turn off until 1) the user manually turns off the cell phone screen, or 2) all the open mobile applications are closed, the screen turn off feature is reactivated, and the screen turn off timer expires causing the screen turn off feature to engage and turn off the cell phone's display. The cell phone can remember the override feature answer for future use. For example, if the override feature is utilized for a particular mobile application a majority of times, the override feature can be engaged without the need to prompt the user each time the mobile application is opened.

In one or more embodiment of the present invention, the system 200 is Operating System (OS) based and not application program based like video or presentation applications. The system 200 can be implemented in OS to allow single implementation and cover a broader range of controls.

In one or more embodiment of the present invention, the system 200 can utilize cognitive items for the cell phone to use to determine if the cell phone's screen turn off feature should be reactivated. Additionally, these cognitive items can be applied to other devices like desktop or laptop computers. For example, user's face or body movement may be used to prevent the desktop or laptop computer from entering the idle screen mode. Some examples of cognitive items include but are not limited to disabling a screen turn off feature when the system 200 detects user's body parts (e.g., palm of the hand, being held by fingers, video game playing motion, a user's face, and other rules), not disabling screen turn off feature while the system 200 detects certain recognizable image where the user is not likely to be actively using the device (e.g., the cell phone is in the office, the cell phone is parallel to the ceiling or floor, the cell phone is parallel to the sky, trees, or ground), keeping track of the user behavior and use it for future override action, and allow the user to turn off the cell phone's screen manually.

In one or more embodiments of the present invention, the system 200 can use cognitive learning to set the screen turn off feature override for all electronic devices. Operating system (OS) based turn off override control allows single implementation and covers a broader range of controls. The system 200 can use non-application program related cognitive items to set the screen turn off override and keep track of the user's interaction and movement, along with the device's physical location and orientation. Then the system 200 can use this information for future screen turn off override control. The system 200 can also allow the user to set the screen turn off override manually.

Figure 3:
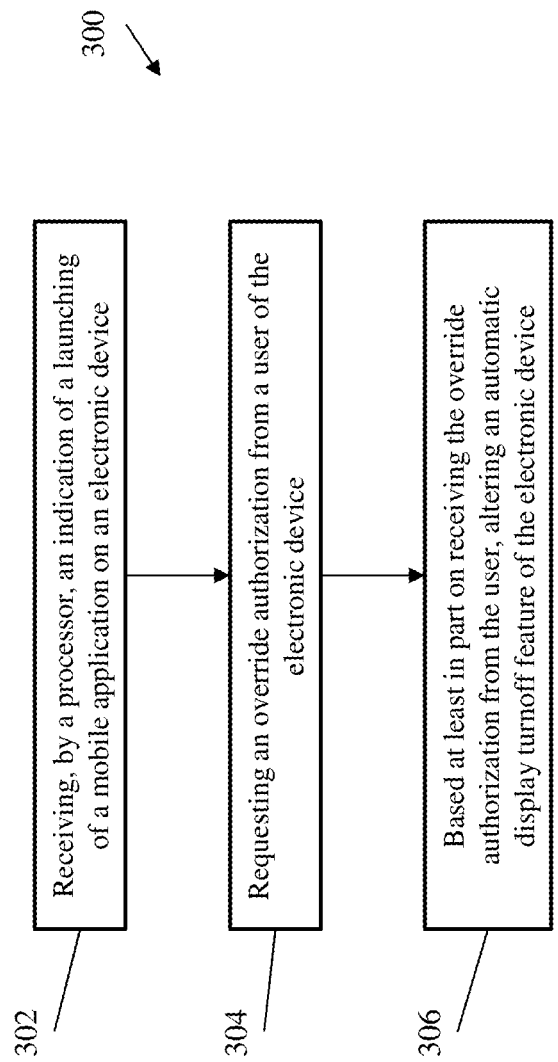
FIG. 3 depicts a flow diagram of a method for display turn off override control in accordance with one or more embodiments.

Referring now to FIG. 3 there is shown a flow diagram of a method 300 for display turn off override control according to one or more embodiments. The method 300 includes receiving, by a processor, an indication of a launching of a mobile application on an electronic device, as shown at block 302. At block 304, the method 300 includes requesting an override authorization from a user of the electronic device. The method 300 includes based at least in part on receiving the override authorization from the user, altering an automatic display turn off feature of the electronic device, as shown at block 306.

Additional processes may also be included. It should be understood that the processes depicted in FIG. 3 represent illustrations, and that other processes may be added or existing processes may be removed, modified, or rearranged without departing from the scope and spirit of the present disclosure.

Figure 4:
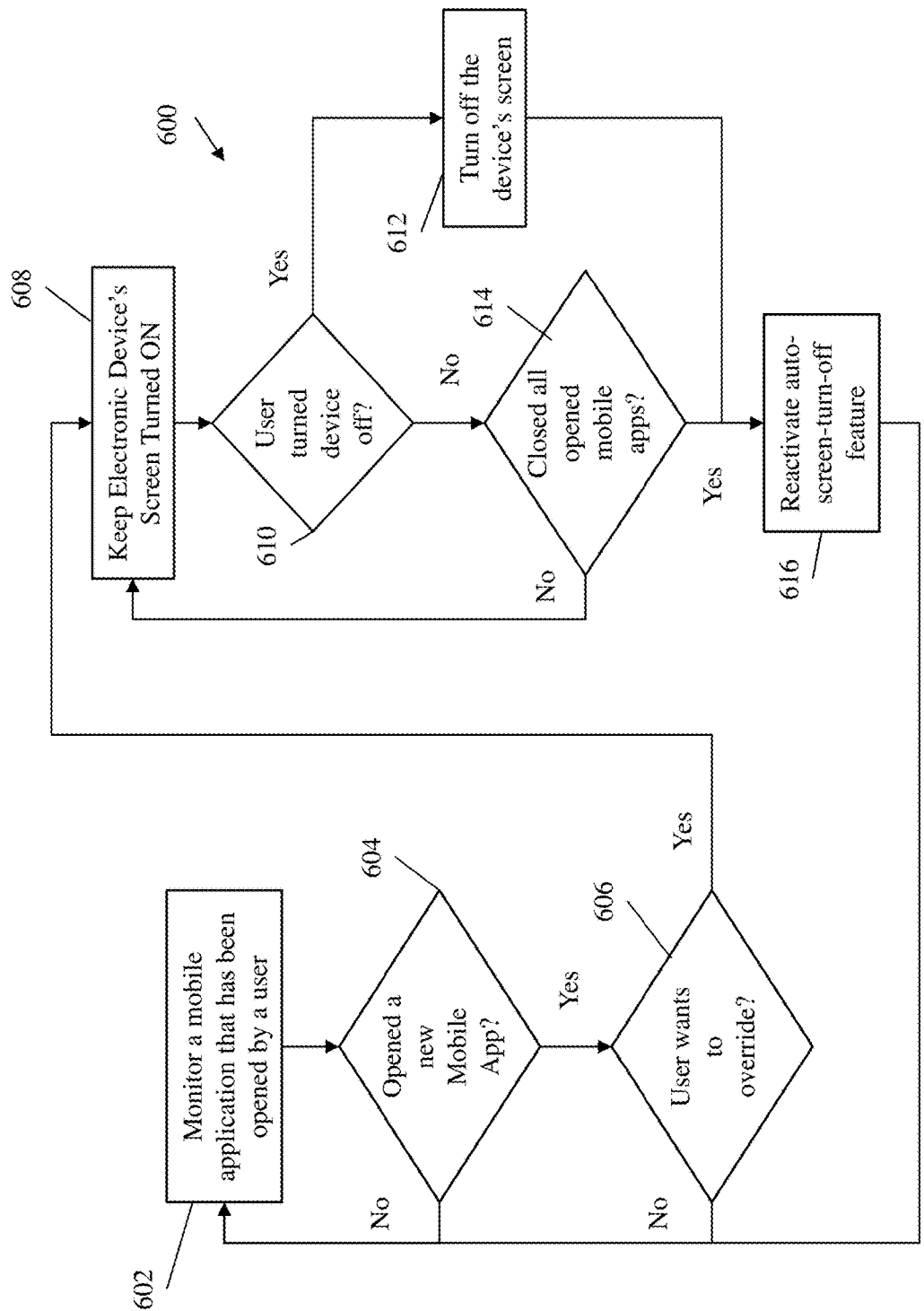
FIG. 4 depicts a flow diagram of a method for display turn off override control in accordance with another embodiment.

Referring now to FIG. 4 there is shown a flow diagram of a method 600 for display turn off override control according to one or more embodiments. The method 600 can be utilized for an electronic device 202 such as, for example, the smart phone depicted in FIG. 4. The method 600 monitors mobile applications opened by a user as shown in block 602. A user can have multiple mobile applications opened on a device. When a new mobile application is opened at block 604, the method checks with the user to see if the user wants to override the automatic display turn off feature, see block 606. This override request can be in a pop-up window on the electronic device and the user can select either a yes or a no to indicate that the user wishes to override the display turn off feature. If the user selects yes, the electronic device's screen is kept on, as shown at block 608. The electronic device can be continuously monitored to check if the user has turned the device off 610. Turning the device off can include turning off the display of the electronic device or hitting a home screen of the electronic device. If the user turns off the electronic device, the screen is turned off, as shown at block 612, and the automatic screen turn off features is reactivated, as shown at block 616. If the user does not turn the device off, the electronic device is monitored to check that the mobile application has been opened or closed, see block 614. If a mobile application is open, the screen remains on as the automatic screen turn off feature is disabled and/or delayed. Once all the mobile applications with the automatic screen turn off feature disabled and/or delayed on the device are closed, the automatic screen turn off is reactivated, as shown at block 616. The method 600 continues to monitor mobile applications on the device, shown at block 602.

Additional processes may also be included. It should be understood that the processes depicted in FIG. 4 represent illustrations and that other processes may be added or existing processes may be removed, modified, or rearranged without departing from the scope and spirit of the present disclosure.

In one or more embodiments of the present invention, the system 200 can utilize cognitive items for the cell phone or user device to determine if the screen turn off feature should be reactivated. For example, if the camera or other sensor on the user device or cell phone determines that the device or cell phone has been placed in a pocket or in a purse or bag, the screen turn off feature can be reactivated. The camera on the phone or device could detect a lack of visible light that would indicate the phone or device was placed in a pocket or bag, such as purse or briefcase. The orientation of the phone or device can also be used to determine the phone or device has been placed in a pocket or has been placed in a location where the screen turn off feature should be reactivated. For example, if the phone or device is placed display side faced down on a table or desk, the screen turn off feature can be reactivated as it is likely the phone or device is not in use.

In one or more embodiments, the electronic device 202 could receive user input 210 in the form of a light pressure touch of the display 204 or a heavy pressure touch of the display 204. The light pressure versus heavy pressure touches could be used to wake up the electronic device 202 or mobile applications 206 on the electronic device 202. Utilizing a pressure sensing technology for the display 204, certain touches of the display may not register has a human gesture. The user may wish to override light pressure touches versus heavy pressure touches as a user input 210.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for display turn off override control, the system comprising a processor coupled to a memory, the processor configured to:
   receive, by a processor, an indication of a launching of a mobile application on an electronic device;
   request an override authorization from a user of the electronic device; and
   based at least in part on receiving the override authorization from the user, alter an automatic display turn off feature of the electronic device;
   receive, from a sensor associated with the electronic device, environmental data comprising orientation data for the electronic device; and
   based at least in part on the environmental data, override the altering of the automatic display turn off feature of the electronic device.

2. The system of claim 1, wherein altering the automatic display turn off features comprises disabling the display turn off feature of the electronic device.

3. The system of claim 1, wherein altering the automatic display turn off feature comprises delaying a timer associated with the display turn off feature of the electronic device.

4. The system of claim 2, wherein the processor is further configured to:
   monitor the mobile application on the electronic device;
   receive an input closing the mobile application; and
   based at least in part on a closing of the mobile application, enable the automatic display turn off feature of the electronic device.

5. A computer program product for display turn off override control, the computer program product comprising a computer readable storage medium having program instructions embodied therewith, the program instructions executable by a processor to cause the processor to perform:
   receiving, by a processor, an indication of a launching of a mobile application on an electronic device;
   requesting an override authorization from a user of the electronic device;
   based at least in part on receiving the override authorization from the user, altering an automatic display turn off feature of the electronic device;
   receiving, from a sensor associated with the electronic device, environmental data comprising orientation data for the electronic device; and
   based at least in part on the environmental data, overriding the altering of the automatic display turn off feature of the electronic device.

6. The computer program product of claim 5, wherein the altering the automatic display turn off features comprises disabling the display turn off feature of the electronic device.

7. The computer program product of claim 5, wherein the altering the automatic display turn off feature comprises delaying a timer associated with the display turn off feature of the electronic device.

8. The computer program product of claim 6, further comprising:
   monitoring the mobile application on the electronic device;
   receiving an input closing the mobile application; and
   based at least in part on a closing of the mobile application, enabling the automatic display turn off feature of the electronic device.

9. A computer-implemented method for display turn off override control, the method comprising:
   receiving, by a processor, an indication of a launching of a mobile application on an electronic device;
   requesting an override authorization from a user of the electronic device;
   based at least in part on receiving the override authorization from the user, altering an automatic display turn off feature of the electronic device;
   receiving, from a sensor associated with the electronic device, environmental data comprising orientation data for the electronic device; and
   based at least in part on the environmental data, overriding the altering of the automatic display turn off feature of the electronic device.

10. The method of claim 9, wherein the altering the automatic display turn off features comprises disabling the display turn off feature of the electronic device.

11. The method of claim 9, wherein the altering the automatic display turn off feature comprises delaying a timer associated with the display turn off feature of the electronic device.

12. The method of claim 10, further comprising:
    monitoring the mobile application on the electronic device;
    receiving an input closing the mobile application; and
    based at least in part on a closing of the mobile application, enabling the automatic display turn off feature of the electronic device.

13. The method of claim 9, wherein the environmental data comprises image data.

14. The method of claim 10, further comprising:
    receiving, by a processor, a home screen input;
    based at least in part on receiving the home screen input, enabling the automatic display turn off feature of the electronic device.

15. The method of claim 9, wherein the mobile application comprises at least one of a video game, a video recorder, or a web browser.

16. The method of claim 10, further comprising:
    receiving, by a processor, an input turning off the display of the electronic device; and
    enabling the automatic display turn off feature based at least in part on the input turning off the display.

\* \* \* \* \*